United States Patent
Mayer et al.

(10) Patent No.: US 8,636,251 B2
(45) Date of Patent: Jan. 28, 2014

(54) TRANSFORMABLE LUGGAGE STORAGE COMPARTMENT FOR AN AIRCRAFT CABIN

(75) Inventors: Tobias Mayer, Hamburg (DE); Thomas Lerche, Jork (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/244,439

(22) Filed: Sep. 24, 2011

(65) Prior Publication Data

US 2012/0012705 A1 Jan. 19, 2012

Related U.S. Application Data (63) Continuation of application No. PCT/EP2010/052440, filed on Feb. 25, 2010.

(60) Provisional application No. 61/162,795, filed on Mar. 24, 2009.

(30) Foreign Application Priority Data

Mar. 24, 2009 (DE) .......................... 10 2009 014 573

(51) Int. Cl.
   *B64D 11/00* (2006.01)
(52) U.S. Cl.
   USPC ..................................... 244/118.5; 244/118.1
(58) Field of Classification Search
   USPC ............ 244/118.1, 118.5; 296/37.8; 248/558, 248/318; 224/311; 220/810, 831–834
   See application file for complete search history.

(56) References Cited

U.S. PATENT DOCUMENTS

| 5,383,628 | A | * | 1/1995 | Harriehausen et al. .... 244/118.1 |
| 5,549,258 | A | | 8/1996 | Hart et al. |
| 5,687,929 | A | * | 11/1997 | Hart et al. .................. 244/118.1 |
| 5,820,076 | A | * | 10/1998 | Schumacher et al. ..... 244/118.5 |

(Continued)

FOREIGN PATENT DOCUMENTS

| CN | 1083007 A | 3/1994 |
| DE | 102007030331 A1 | 1/2009 |

(Continued)

OTHER PUBLICATIONS

German Office Action dated Match 1, 2010 for German Application No. 102009014573.7.

(Continued)

*Primary Examiner* — Philip J Bonzell
*Assistant Examiner* — Timothy Schwarz
(74) *Attorney, Agent, or Firm* — Ingrassia Fisher & Lorenz, P.C.

(57) ABSTRACT

A storage compartment is provided for a transportation means, for mounting in an overhead region. The storage compartment includes, but is not limited to a universal housing module and a transformable container module. Various container modules, in particular fixed bins and pivot bins, can be installed in the universal housing module without this requiring any alteration of the housing module. The transformable container module can be converted within the housing module from a state as a fixed container to a state as a movable chute.

17 Claims, 4 Drawing Sheets

(56) References Cited

U.S. PATENT DOCUMENTS

| | | | |
|---|---|---|---|
| 5,823,472 A * | 10/1998 | Luria | 244/118.1 |
| 5,934,615 A * | 8/1999 | Treichler et al. | 244/118.5 |
| 6,062,509 A | 5/2000 | Burrows et al. | |
| 6,527,325 B2 | 3/2003 | Steingrebe et al. | |
| 7,258,406 B2 | 8/2007 | Stephan et al. | |
| 7,823,830 B2 | 11/2010 | Feldkirchner et al. | |
| 2002/0101090 A1 * | 8/2002 | Steingrebe et al. | 296/37.8 |
| 2007/0164154 A1 * | 7/2007 | Bock | 244/118.5 |
| 2008/0251640 A1 * | 10/2008 | Johnson et al. | 244/118.1 |
| 2009/0250553 A1 * | 10/2009 | Bock | 244/118.5 |
| 2010/0019087 A1 | 1/2010 | Warner et al. | |
| 2010/0206985 A1 | 8/2010 | Rahlff | |
| 2010/0288879 A1 * | 11/2010 | Bock et al. | 244/118.5 |
| 2011/0139929 A1 * | 6/2011 | Young et al. | 244/118.5 |

FOREIGN PATENT DOCUMENTS

| | | |
|---|---|---|
| DE | 102009014573 A1 | 9/2010 |
| EP | 0718189 A1 | 6/1996 |
| WO | 2006087183 A1 | 8/2006 |
| WO | 2008104529 A2 | 9/2008 |
| WO | 2009003945 A1 | 1/2009 |

OTHER PUBLICATIONS

International Preliminary Report on Patentability dated Sep. 27, 2011 for International Application No. PCT/EP2010/052440.
International Search Report dated Oct. 7, 2010 for International Application No. PCT/EP2010/052440.
Chinese Patent Office, Chinese Office Action dated Oct. 22, 2013 for Application No. 100004.

* cited by examiner

TRANSFORMABLE LUGGAGE STORAGE COMPARTMENT FOR AN AIRCRAFT CABIN

CROSS-REFERENCE TO RELATED APPLICATION

This application is a continuation of International Application No. PCT/EP2010/052440, filed Feb. 25, 2010, which was published under PCT Article 21(2) and which claims priority to German Patent Application No. 102009014573.7 filed Mar. 24, 2009 and of U.S. Provisional Patent Application No. 61/162,795 filed Mar. 24, 2009, the disclosure of which applications is hereby incorporated herein by reference.

TECHNICAL FIELD

The technical field relates to storage compartments of transportation means. In particular, the technical field relates to a storage compartment for an aircraft, for mounting in an overhead region, to a transformable container module for a storage compartment, to a housing module for a storage compartment, to an aircraft, and to a method for retrofitting a transferrable container module.

BACKGROUND

In present-day aircraft, two types of storage compartments are used; on the one hand so-called fixed bins that are installed so as to be rigid, and on the other hand so-called movable bins or pivot bins that, for example by pivoting, can be pivoted down from a closed position to an open position. When furnishing and configuring the passenger cabin, as a rule either one or the other storage compartment is installed in the corresponding cabin section.

For short-haul flights (within the short-range program) presently fixed bins are in use. They feature a robust design and comparatively modest requirements relating to their technical complexity. However, these rigidly-installed storage compartments project into the cabin, thus making the cabin appear more confined.

The movable storage compartments (pivot bins) comprise a housing and a movable chute into which the item of luggage is placed. In the open state of the storage compartment the chute provides an ergonomically advantageous loading height. In its closed state the pivot bin has, as a rule, a positive effect on the impression of space because it has been pivoted upwards. However, pivot bins are comparatively heavy and often technically more complex than rigidly fixed bins, in particular due to the required kinematics and the adapted mechanics for reducing the actuation forces to be exerted.

Depending on the end user, the above-mentioned characteristics are accorded different emphasis. When there is a change in ownership of an aircraft, (often) expensive reconfiguration of the cabin is necessary in order to adapt the cabin to the corresponding customer requirements. Since both storage compartments have different attachment coordinates such a changeover is expensive, and in quite some cases altogether impossible.

DE 10 2007 030 331 A1 and WO 2009/003945 A1 describe storage compartment modules for an interior of an aircraft, which storage compartment modules comprise a housing and a container.

It is at least one object to state a flexibly-usable storage compartment for luggage for the cabin of a transportation means. In addition, other objects, desirable features and characteristics will become apparent from the subsequent summary and detailed description, and the appended claims, taken in conjunction with the accompanying drawings and this background.

SUMMARY

Stated are a storage compartment for an aircraft, for mounting in an overhead region, a transformable container module for a storage compartment, a housing module for a storage compartment, an aircraft comprising two or more rows of storage compartments, and a method for converting a transformable container module.

The embodiments described equally relate to the storage compartment, the transformable container module, the housing module, the aircraft and the method. In other words, the characteristics hereinafter described, for example, with regard to the storage compartment can also be implemented as method-related steps in the method and vice versa.

According to an embodiment, a storage compartment for an aircraft, for mounting in an overhead region (for example in the passenger cabin of the aircraft), is stated, which storage compartment comprises a universal housing module and a transformable container module. The housing module is designed to accommodate the transformable container module, wherein the container module is used to accommodate items of luggage. The container module is designed both for rigid installation in the housing module in the state of a fixed container, and for movable installation in the housing module in the state of a movable chute.

In other words, the container module can be transformed from one state to the other state. To this effect, conversion of the module may be required. However, to do so, the housing module need not be changed. In no case does this necessitate an exchange of the housing module.

In this manner it is possible for the storage compartment to be converted according to the desired cabin layout. On the one hand it can comprise a movable chute, and on the other hand a fixed rigidly-installed container, also known as a fixed bin. Conversion can thus take place in a simple manner with little effort without influencing the adjacent components such as the ceiling panels or the lateral wall paneling and the passenger services duct.

According to a further embodiment, the container module is convertible within the housing module from its state as a fixed container to its state as a movable chute. The container module need not be specially deinstalled to effect this transformation. Instead, it is possible with only minor manipulation or in an automated embodiment simply by pushing a button, to transform the container module and thus the storage compartment.

According to a further embodiment, the container module in its state as a fixed container comprises a hinged storage compartment lid. In contrast to this, in its state as a movable chute the container module does not contain the hinged storage compartment lid. In the latter case the hinged storage compartment lid is, for example, located within the housing module. The hinged storage compartment lid is thus mounted on the housing module (or in the housing module) when the container module is in its state as a movable chute.

According to a further embodiment, the storage compartment furthermore comprises a rail system for guiding the hinged storage compartment lid from a state in which the hinged storage compartment lid is affixed to the housing module to a state in which the hinged storage compartment lid is affixed to the container module.

According to a further embodiment, the storage compartment comprises a locking arrangement for locking the container module when said container module is in its state as a fixed container.

According to a further exemplary embodiment, the container module in its state as a fixed container has a larger storage volume than in its state as a movable chute. In order to assume the state of the fixed container, for example a ceiling segment of the container module can be folded upwards.

According to a further embodiment, a transformable container module for a storage compartment for an aircraft for mounting in a housing module in an overhead region of the passenger cabin is stated. The housing module is designed for mounting the container module. The container module is used to accommodate items of luggage. As already described above, the container module is designed for rigid installation in the housing module in its state as a fixed container, and for movable installation in the housing module in its state of a movable chute.

According to a further embodiment, the container module can be converted, within the housing module, from its state as a fixed container to its state as a movable chute.

According to a further embodiment, in its state as a fixed container the container module comprises a hinged storage compartment lid. The container module in its state as a movable chute does not comprise the hinged storage compartment lid.

According to a further embodiment, the hinged storage compartment lid is mounted to the housing module when the container module is in its state as a movable chute.

According to a further embodiment, a housing module for a storage compartment for an aircraft for mounting in an overhead region (for example in a passenger cabin) is stated, wherein the housing module is designed to accommodate a container module described above and below.

According to a further embodiment, an aircraft is stated, for example a passenger aircraft comprising two or more seat rows, above which seat rows the storage compartments described above and below are arranged in a row.

According to a further embodiment, a method for converting a transformable container module in an overhead region of a passenger cabin of a transportation means is stated, in which method in a first step the container module is accommodated in a housing module. The container module is used to accommodate items of luggage. In a second step, affixing the container module in the housing module in its state of a fixed container takes place. In a third step the container module can then be converted (transformed) within the housing module to its state as a movable chute. This does not require expensive deinstallation of the original storage compartment and installation of a new storage compartment.

BRIEF DESCRIPTION OF THE DRAWINGS

The present invention will hereinafter be described in conjunction with the following drawing figures, which are diagrammatic and not to scale and like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1A:
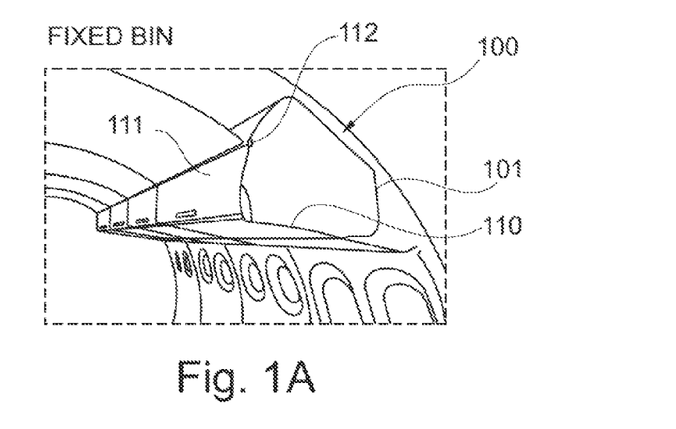
FIG. 1A shows a section of an aircraft cabin with a row of storage compartments according to an embodiment with the storage compartments firmly anchored in place, in other words with fixed bins.

FIG. 1A shows a row of several storage compartments 100 with storage compartments 110 that are arranged on the right-hand side in the overhead region of a passenger cabin of a transportation means. For example, a passenger cabin of an aircraft is shown. However, the storage compartments described presently and below can also be installed in a water vehicle, a road vehicle (for example a bus) or a rail vehicle.

Figure 1B:
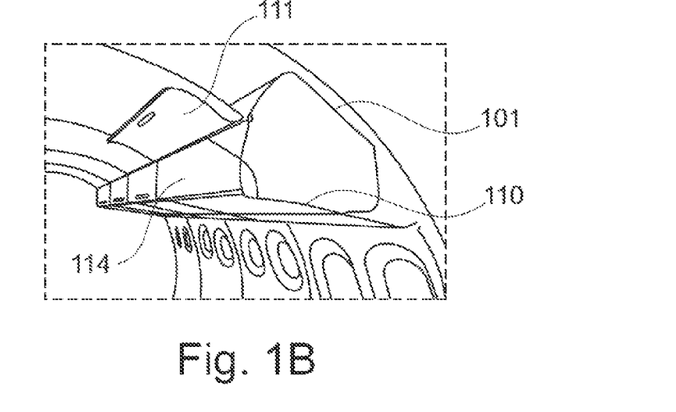
FIG. 1B shows the storage compartments of FIG. 1A in an open state.

The storage compartments shown are permanently installed rigid storage compartments. All of the storage compartments described presently and below comprise a housing module 101 which in each case is of an identical design and is used to accommodate corresponding container modules. In the exemplary embodiment of FIG. 1A and FIG. 1B the container modules (storage compartments) 110 are so-called rigid container modules or fixed bins which cannot be moved. At the front, each container module comprises a hinged cover 111 that is pivoted on the axis 112. FIG. 1B shows the storage compartments of FIG. 1A. The first storage compartment is hinged open.

Figure 2A:
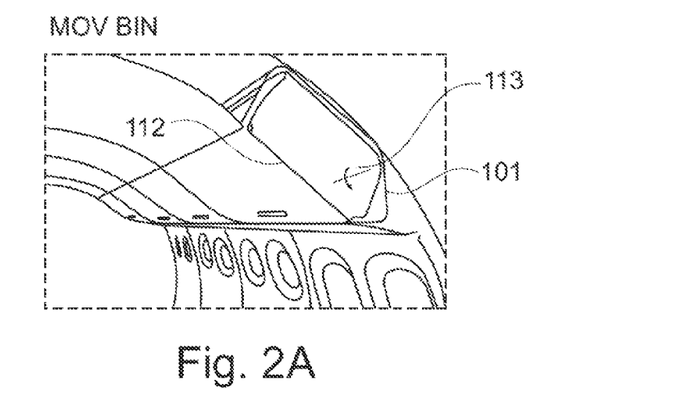
FIG. 2A shows a row of storage compartments according to an embodiment with movable chutes, also referred to as pivot bins or movable bins.
Figure 2B:
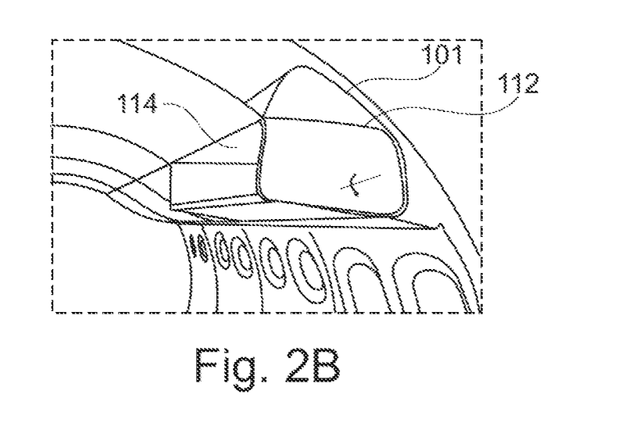
FIG. 2B shows the storage compartments of FIG. 2A in their pivoted-down state.

FIG. 2A shows another configuration. In this illustration a so-called pivot bin in the form of a movable chute 112 is installed in the housing module 101. In the state shown in FIG. 2A the chute is in its hinged-up state, in which it can be hinged open downwards along the arrow 113. This is shown in FIG. 2B. In the hinged-down state the luggage can be inserted through the opening 114 into the chute.

Figure 3A:
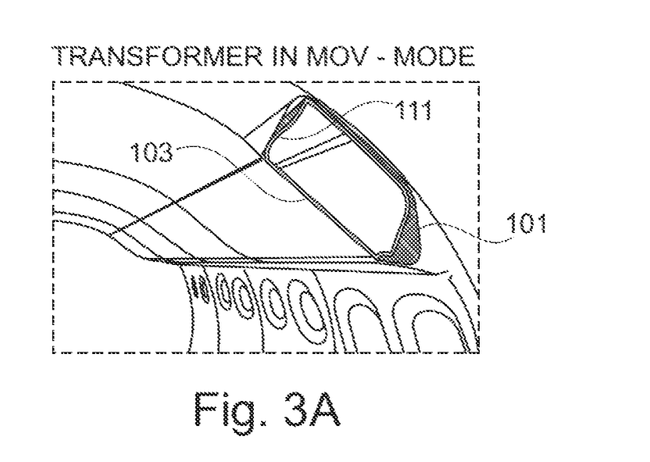
FIG. 3A shows a row of storage compartments with transformable container modules according to an embodiment, in the so-called movable mode.

FIG. 3A shows a housing module 101 into which a transformable container module 103 in the form of a movable chute is installed. In this arrangement the hinged cover 111 is attached to the inside of the housing module 101. FIG. 3A shows the chute 103 in its pivoted-up state.

Figure 3B:
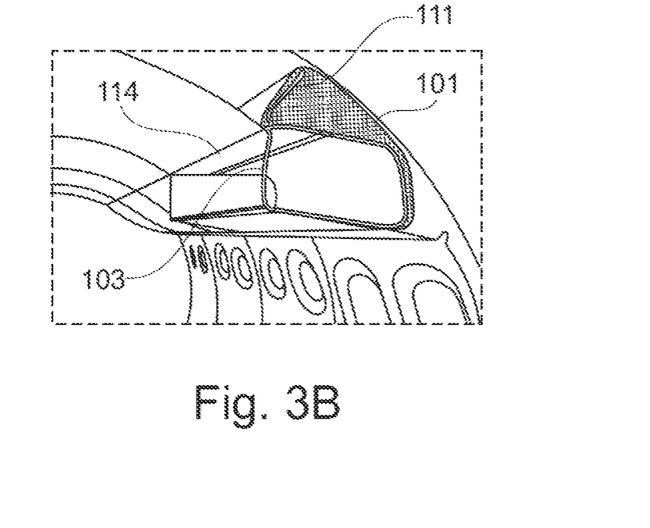
FIG. 3B shows the storage compartments of FIG. 3A, where one compartment is pivoted down.

FIG. 3B shows the chute 103 in its pivoted-down state. As shown in FIG. 3B the hinged cover 111 is still within the housing module 101, so that the luggage can be inserted through the opening 114 into the chute.

Figure 4A:
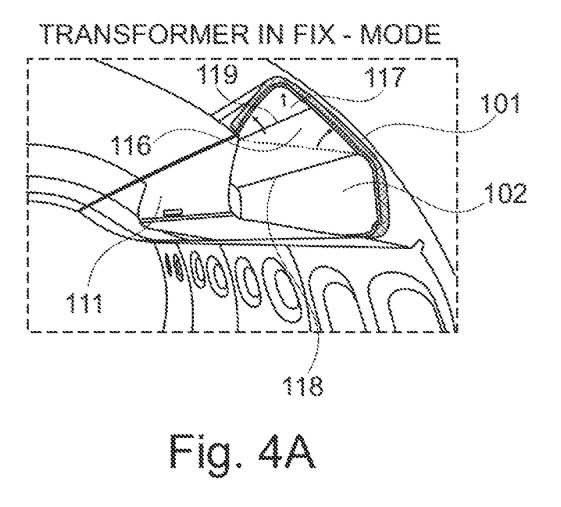
FIG. 4A shows the storage compartments of FIG. 3A and FIG. 3B in the so-called rigid mode or fixed mode.

FIG. 4A shows the housing module 101 with the transformable container module, this time in its state as a fixed container 102. In this state the two ceiling elements 116, 117 of the container module 102 are pivoted upwards and where applicable are attached to the housing module 101. In order to make it possible to pivot the ceiling elements 116, 117 upwards, for example hinges 118, 119 are provided that interconnect the two ceiling elements, i.e. connect the first ceiling element 116 to the rear of the transformable container module 102.

Figure 4B:
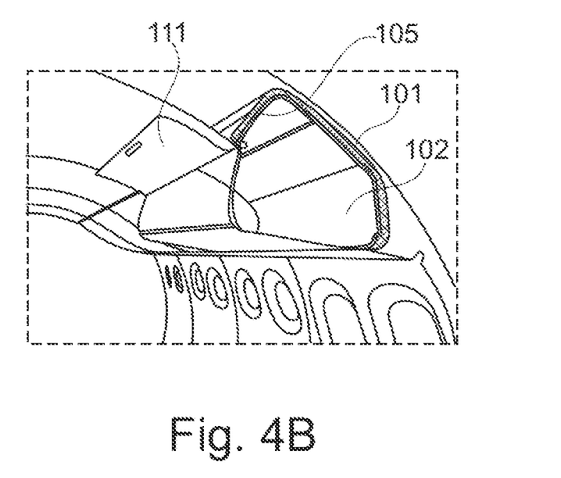
FIG. 4B shows a storage compartment of FIG. 4A in an open state.

As shown in FIG. 4A, the hinged cover 111 is now displaced downwards and is mounted on the housing module so that it can be used for opening and closing the container module 102. FIG. 4B shows the storage compartment in the mode of FIG. 4A in its open state in which the hinged cover 111 is hinged forwards.

The surrounding geometry (housing or housing module 101) of the transformable container module 102, 103 (transformer—OHSC) makes it possible to install a fixed bin and to install a pivot bin. Thus, fixed bins and/or pivot bins and/or transformer bins can be installed in the cabin, without there being a need for this purpose to undertake any alterations on the housing module 101.

The chute of the transformer bin 102, 103 can act both as a fixed bin and as a pivot bin. In the mode of the pivot bin the chute is reduced to the minimum required storage compartment volume. Thus the chute can be closed even if it is fully loaded. In its closed state the transformer bin creates a corresponding impression of space in the cabin.

The hinged storage compartment lid, which is used in the fixed bin mode in order to secure the luggage, is attached to the chute and during opening pivots open additionally. A further option consists of designing the hinged cover as a component of the housing module 101 where it is pulled out when required by means of a rail system. In FIG. 4B the rail system is designated 105.

In the fixed bin mode the chute is locked in its open state and is closed by means of the additional hinged cover. By a change in the geometry the chute increases the storage volume in a region that is not visible from the cabin. In this manner, the additional space in the housing module, which space arises in this state, can be used more efficiently There is an advantage associated with the storage compartment according to in that it provides a base architecture into which a conventional fixed bin and/or a conventional pivot bin can be installed. In this manner it is possible during reconfiguration of the aircraft cabin to exchange the storage compartments without much expenditure, without this requiring influencing or changing connections, linkages or aircraft systems. In other words, the aircraft cabin can be reconfigured from a pure fixed bin storage compartment arrangement to a pure pivot bin storage compartment arrangement without there being a need to make far-reaching changes to the adjacent components or the adjacent systems. There is a further advantage in that a transformable container module is provided which can be changed between the two storage compartment types.

If the company operating the aircraft provides, for example, a differentiated cabin product in order to generate additional revenue sources by offering various services such as enhanced comfort, this is visually supported by means of a different architecture and the clearly different cabin appearance resulting therefrom. Accordingly, two cabins are united in one cabin.

The transformable container module (also referred to as the transformer bin) can be used as a flexible transitional storage compartment which during short-term changes of the cabin class can act as an efficient differentiation and delimitation criterion in terms of the cabin architecture, its impression of space, and the storage compartment volume provided. Thus a spacious futuristic cabin with a medium storage compartment volume can be transformed into a practical cabin with a large storage compartment volume.

A further application option of the storage compartment is to provide a so-called pivot bin cabin, which during above-average requirements for storage space can be adapted by means of the transformable container module. Predominantly pivot bins are installed in the housing of the cabin. Instead of installing one or several pivot bins or pivot storage compartments, transformer bins are installed in the state of the movable mode. Thus a pure pivot bin cabin is obtained. If the storage space in the cabin becomes scarce, there is a reserve of storage space in that the transformer bins are transformed from their movable mode to their fixed bin mode so that the storage compartment volume is increased.

Figure 5:
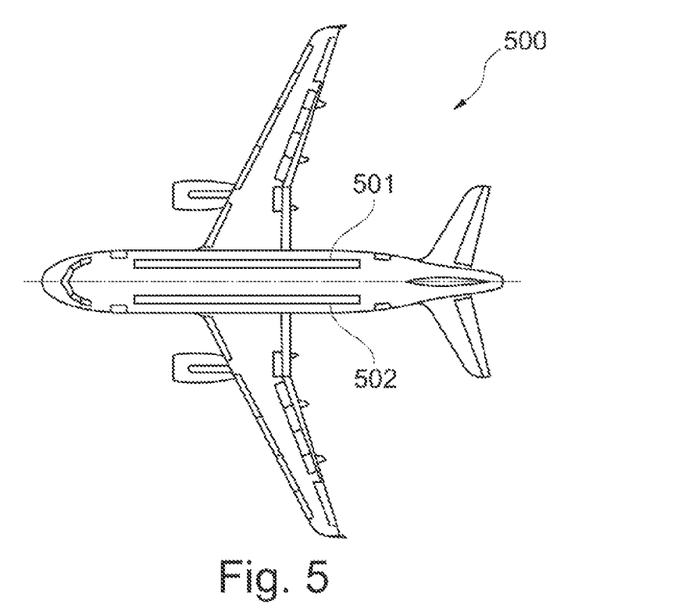
FIG. 5 shows an aircraft with two rows of storage compartments according to an embodiment.

FIG. 5 shows an aircraft 500 with two rows of storage compartments. One row 501 of storage compartments is installed on the starboard side in the overhead region, and the other row 502 is installed on the port side of the passenger cabin. It is possible to provide still further such storage compartment rows, for example in the middle region of the passenger cabin.

Figure 6:
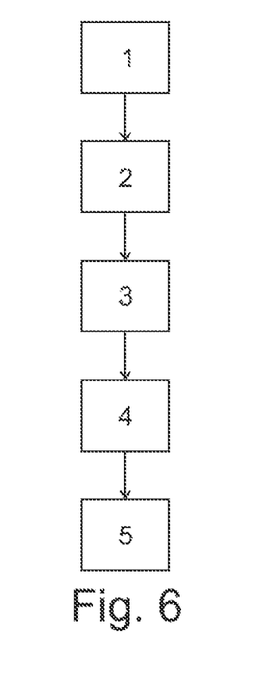
FIG. 6 shows a flow chart of a method according to an embodiment.

FIG. 6 shows a flow chart of a method according to an exemplary embodiment of the invention. In step 1 a transformable container module is installed in a corresponding housing module. In step 2 the container module is affixed to the housing module so that it assumes the state of a fixed container (fixed bin mode). In step 3 the ceiling (comprising one or several ceiling elements) of the container module is pivoted upwards and attached to the housing module. In step 4 the hinged cover of the container module is pivoted upwards and also attached to the housing module, and in step 5 the container module (which has now assumed the state of a movable chute) can be pivoted upwards into the housing module.

Below, the vocabulary terms used are explained:

OHSC: overhead storage compartment: storage compartment in the cabin, as a rule arranged above the passenger seats.

Fixed bin: storage compartment with a fixed position. A hinged cover closes the compartment, thus preventing items of luggage from falling out.

Movable bin or pivot bin: movable storage compartment that is installed in a housing.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A transformable container assembly of an aircraft that is configured to accommodate luggage items, comprising:
   a housing module in an overhead region of the aircraft;
   a transformable container module configured to mount within the housing module in an upper position wherein the transformable container module fits substantially within the housing module and a lower position, protruding below the housing module; and the transformable container module configured to mount within the housing module in a movable chute state;

said transformable container module comprises:

a foldable ceiling segment which in a first position defines a first container storage volume that allows the transformable container module to move between the upper position and the lower position, and in a second position the ceiling segment is foldable upward to convert the transformable container module to a fixed container state having a second container storage volume which is greater than the first container storage volume and which fixes the transformable container module in the lower position.

2. The transformable container assembly of claim 1, wherein the transformable container module is configured to convert to the fixed container state within the housing module.

3. The transformable container assembly of claim 2, wherein the transformable container module in the fixed container state comprises a hinged storage compartment lid wherein the transformable container module in the movable chute state does not contain the hinged storage compartment lid.

4. A storage compartment assembly for an aircraft that is configured to mount in an overhead region, the storage compartment assembly comprising:

a universal housing module;

a transformable container module configured to mount within the universal housing module in an upper position wherein the transformable container module fits substantially within the universal housing module and a lower position, protruding below the universal housing module; and said transformable container module comprises:

a foldable ceiling segment which in a first position defines a first container storage volume that allows the transformable container module to move between the upper position and the lower position, and in a second position the ceiling segment is foldable upward to convert the transformable container module to a fixed container state having a second container storage volume which is greater than the first container storage volume and which fixes the transformable container module in the lower position, wherein the universal housing module is configured to accommodate the transformable container module.

5. The storage compartment assembly of claim 4, wherein the transformable container module is configured to convert to the fixed container state within the universal housing module.

6. The storage compartment assembly of claim 5, wherein the transformable container module in the fixed container state comprises a hinged storage compartment lid.

7. The storage compartment assembly of claim 6, wherein the hinged storage compartment lid is mounted on the universal housing module when the transformable container module is in the upper position.

8. The storage compartment assembly of claim 6, further comprising a rail system configured to guide the hinged storage compartment lid from a first state in which the hinged storage compartment lid is affixed to the universal housing module to a second state in which the hinged storage compartment lid is affixed to the transformable container module.

9. The storage compartment assembly of claim 4, further comprising a locking arrangement configured to lock the transformable container module when the transformable container module is in the fixed container state.

10. An aircraft, comprising:

a first row of storage compartments; and a second row of storage compartments, the second row of storage compartments comprising:

a universal housing module;

a transformable container module configured to mount within the universal housing module in an upper position wherein the transformable container module fits substantially within the universal housing module and a lower position, protruding below the universal housing module; and said transformable container module comprises:

a foldable ceiling segment which in a first position defines a first container storage volume that allows the transformable container module to move between the upper position and the lower position, and in a second position the ceiling segment is foldable upward to convert the transformable container module to a fixed container state having a second container storage volume which is greater than the first container storage volume and which fixes the transformable container module in the lower position, wherein the universal housing module is configured to accommodate the transformable container module.

11. The aircraft of claim 10, wherein the transformable container module is configured to convert to the fixed container state within the universal housing module.

12. The aircraft of claim 11, wherein the transformable container module in the fixed container state comprises a hinged storage compartment lid.

13. The aircraft of claim 12, wherein the hinged storage compartment lid is mounted on the universal housing module when the transformable container module is in the upper position.

14. The aircraft of claim 13, further comprising a rail system configured to guide the hinged storage compartment lid from a first state in which the hinged storage compartment lid is affixed to the universal housing module to a second state in which the hinged storage compartment lid is affixed to the transformable container module.

15. The aircraft of claim 10, further comprising a locking arrangement configured to lock the transformable container module when the transformable container module is in the fixed container state.

16. The aircraft of claim 10, wherein the first row of storage compartments comprise:

a second universal housing module;

a second transformable container module configured to mount within the second universal housing module in an upper position wherein the second transformable container module fits substantially within the second universal housing module and a lower position, protruding below the second universal housing module; and said second transformable container module comprises:

a second foldable ceiling segment which in a first position defines a first container storage volume that allows the second transformable container module to move between the upper position and the lower position, and in a second position the second ceiling segment is foldable upward to convert the second transformable container module to a fixed container state having a second container storage volume which is greater than the first container storage volume and which fixes the second transformable container module in the lower position, wherein the second universal housing module is configured to accommodate the second transformable container module.

17. A method for converting a transformable container module, which is configured to accommodate luggage items, in an overhead region of a passenger cabin of transportation, comprising:

accommodating the transformable container module in a housing module;

an upper position wherein the transformable container module fits substantially within the housing module and a lower position, protruding below the housing module; and folding a foldable ceiling segment of the transformable container module from a first position, in which the transformable container module defines a first container storage volume and the transformable container module is movable between the upper position to the lower position, upward to a second position to convert the transformable container module to a fixed container state having a second container storage volume which is greater than the first container storage volume and thereby fixing the transformable container module in the lower position.

* * * * *